APPARATUS FOR SUPERVISING THE LENGTH OF MAGNETIC TAPE AVAILABLE IN A BUFFER STORAGE DEVICE

Filed Dec. 10, 1958

Inventor
Werner Weiss
By [signature]
Att'y.

United States Patent Office 3,248,028
Patented Apr. 26, 1966

3,248,028

APPARATUS FOR SUPERVISING THE LENGTH OF MAGNETIC TAPE AVAILABLE IN A BUFFER STORAGE DEVICE

Werner Weiss, Munich, Germany, assignor to Siemens and Halske Aktiengesellschaft, Berlin and Munich, Germany, a corporation of Germany Filed Dec. 10, 1958, Ser. No. 779,443
Claims priority, application Germany, Jan. 31, 1958, S 56,777
4 Claims. (Cl. 226—118)

Figures 1, 2, 3:
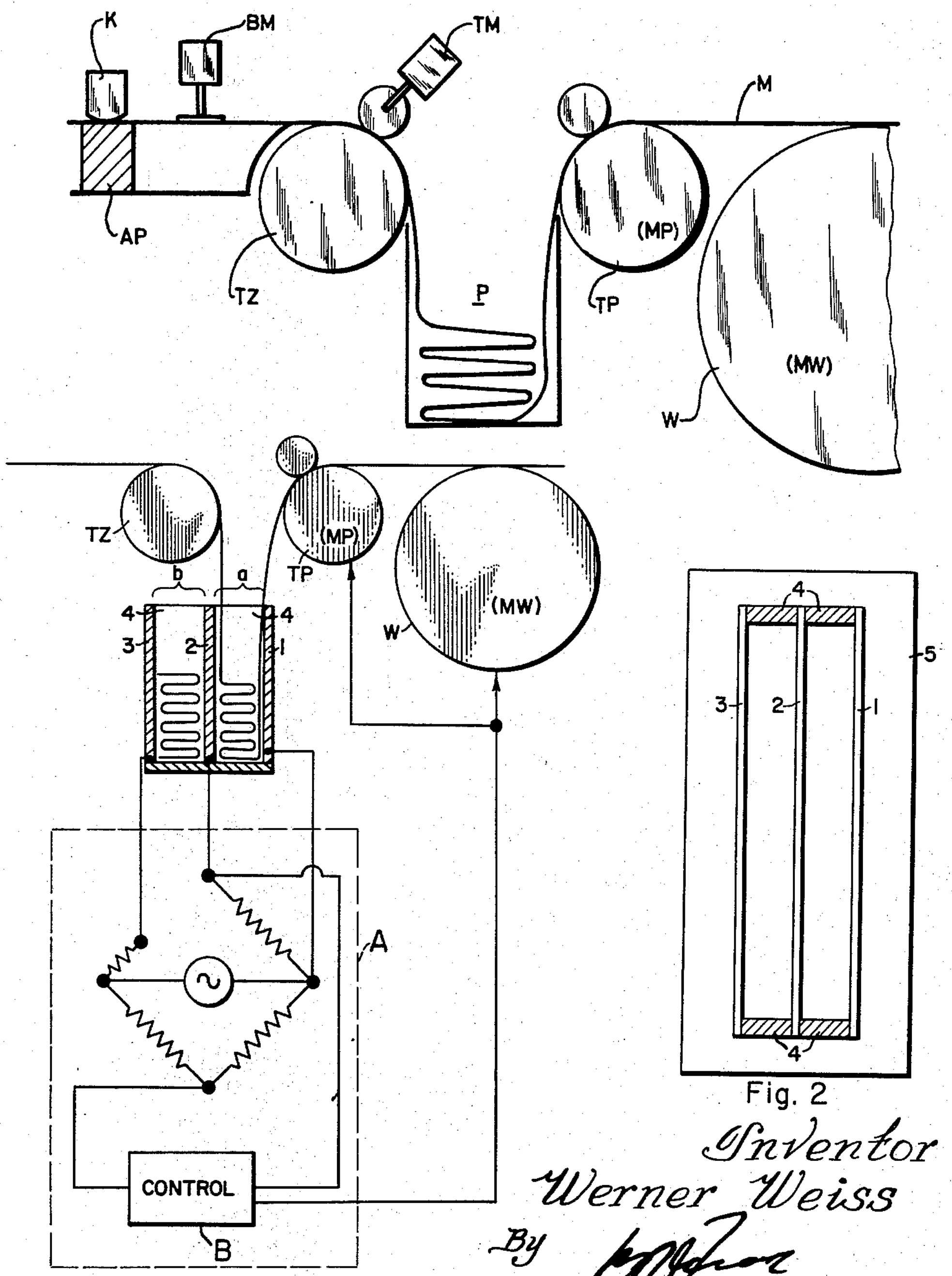

This invention is concerned with supervising the length of magnetic tape available in a buffer storage device of magnetic tape apparatus.

Tape storage devices are frequently being used in data processing machines, especially when a great deal of information is to be stored without any particular requirements with respect to the times at which the individual information data are to be made available.

The individual information data are generally recorded on a plurality of tracks of magnetic tapes. Plural track magnetic tapes have become known with lengths up to several hundred meters. In order to reach the individual information data within relatively reasonable times, it is necessary to provide for tape speeds of several meters per second, for example, about three meters per second. However, the magnetic tape is not to be moved continuously past the magnetic heads but must be respectively stopped and started again in the course of a pickup operation. The switching over from one to the other direction of motion must not consume too much time, practical operation requiring a reversal or stop interval amounting to less than three milliseconds, during which the tape is respectively brought to operating speed or stopped.

The relatively great length of the magnetic tape requires relatively large rolls for the winding and unwinding thereof. The quick start-stop times applied do not allow braking of the entire rolls to the desired speed. In order to avoid switching over the rolls, so-called buffer storage means have been proposed, to be provided for the magnetic tape between the pickup and the record means and the individual winding devices. The buffer storage means may in the simplest case provide for a looped portion of the tape which, however, must be large enough to fully satisfy the above noted requirements so far as the acceleration is concerned. The looped tape portion may also be directly utilized for the control of the winding devices which must be effected much slower than the control of the tape in the pickup region. It will be at once realized that the looped portion of the magnetic tape would have to be several meters long so as to fully satisfy the explained requirements. This is in practical operation impossible.

So-called buffer chambers in the general form of cassettes have therefore been disposed between the winding devices and the pickup means, making it possible to store an amount of magnetic tape sufficient for effecting the control without subjecting the tape to undue stresses. Thus for example, tape is being fed from the winding device for storage in several layers in a buffer storage device and is withdrawn therefrom as required for the pickup or reading and vice versa. The requirement placed on the buffer storage device merely demands that the magnetic tape is as loosely stored as possible so that it may be withdrawn without calling for forces of any particular magnitude and thus giving assurance for operation, substantially without slip, of the control device for the magnetic tape disposed directly adjacent to the pickup device. Moreover, the buffer storage shall for reasons of construction occupy a space as small as possible.

Difficulties have been experienced in continuously supervising the length of magnetic tape contained in the buffer chambers. It must be considered in this connection that the control of the winding devices can be properly matched to the operation of the device which moves the magnetic tape with respect to the pickup area only by supervising the tape length so as to assure that sufficient tape length is always available.

The invention is concerned with a device for respectively measuring and supervising the length of tape disposed in a buffer chamber. In accordance with the invention, the cassette-like buffer chamber is constructed so that two walls thereof form a capacitor, the capacitance of which is measured as a criterion for the tape length. The available length of tape which is non-metallic is disposed between the walls forming the capacitor.

The capacitance measurement may in the simplest case be effected by a bridge circuit by the use of a comparison capacitance which may be in particularly advantageous manner in the form of a second cassette containing a magnetic tape of average storage length.

The various objects and features of the invention will appear from the following description with reference to the accompanying drawing in which FIG. 1 is a schematic view which shows an embodiment illustrating part of a customary magnetic tape device comprising buffer storage means;

FIG. 2 is a plan view showing two buffer storage chambers disposed side by side, one of the chambers constituting the comparison or standard tape chamber and the other containing the amount of normal tape stored therein; and FIG. 3 is a view similar to FIG. 1 illustrating the utilization of the storage chambers shown in FIG. 2.

Referring now to FIG. 1, M designates the non-metallic magnetic tape. The information data recorded or to be recorded on the tape is to be respectively recorded and picked up or read by magnetic head K which is disposed opposite the pressure pad AP. The magnetic tape M is moved within the area of the magnetic head K by means of a rotating transport roller TZ which takes the tape along responsive to actuation of transport magnet TM pressing the tape against the roller TZ. Brake magnet BM may be actuated to press the tape against a supporting guide so as to impart a brake force thereto. The tape is wound upon a reel or spool W.

Between the reel W and the scanning device K is disposed the buffer storage P in which the tape coming from the scanning device is stored and from which it is withdrawn on its way to the winding reel and vice versa, depending upon the control thereof. The withdrawal of the tape is effected by a transport roller TP. A complete tape storage comprises two tape winding spools or reels and winding means associated therewith. Accordingly, there will be at each side two motors for the winding and unwinding of the tape, namely, a motor MW which drives the tape reel and a further motor MP for feeding the tape into the buffer chamber by way of a transport roller against which the tape is pressed. The transport roller TZ is driven by means of a central drive motor controlled from the storage device.

So long as half of the buffer chamber P is filled with magnetic tape, the motors MP and MW will stand still. It is thereby assumed that the motor MP is controlled depending upon the tape content in the buffer chamber while the motor MW produces slight torque to keep the tape tensioned. As soon as more than half of the chamber is filled with magnetic tape, the motor MP will be actuated and the tape is drawn from the chamber. The motor MP may operate as a generator if the pull on the tape is exclusively exerted by the motor MW. If less than half of the chamber is filled with magnetic tape, the motor MP will feed tape from the winding device into the chamber.

In accordance with the invention, as has been said before, the measuring of the tape content in the buffer chamber is based upon measurement of the capacitance of the capacitor formed by two oppositely disposed conductive side walls of the chamber P. The non-metallic magnetic tape contained in the buffer chamber affects the capacitance of such capacitor and alteration of the capacitance value may be directly utilized for the control of the motor MP.

Since the absolute capacitance value may with half filled buffer chamber P be altered due to temperature and humidity conditions and the like, it will be advantageous to provide a second buffer chamber filled to one-half thereof with a comparision length of magnetic tape immediately adjacent the buffer chamber P. FIGS. 2 and 3 indicate a corresponding arrangement.

As will be seen from FIGS. 2 and 3 the two buffer storage chambers are disposed directly adjacent one another, one of the chambers, for example, the left chamber, functioning as the normal or standard tape chamber containing a defined length of magnetic tape, and the right hand chamber containing the stored length of tape required for the scanning operation. Both chambers are constructed as capacitors respectively designated *a* and *b*, that is, the individual chamber walls, 1, 2 and 3 serve as capacitor plates which are interconnected by means of insulating walls 4. The measuring of the capacitance may be effected in known manner by the use of a known measuring bridge A considering the comparison standard. Going under the null or zero value will indicate that the operating buffer chamber does not contain a sufficient amount of magnetic tape and if the null or zero value is exceeded, it will indicate that too much magnetic tape is contained in the operating buffer chamber. The winding device can accordingly by correspondingly controlled by suitable control means to provide for appropriate corrections. The chambers are provided with shielding means 5.

The invention is not inherently limited to details of the described and illustrated example. The buffer storage means (chambers) may be arranged differently. It is, for example, not absolutely necessary to dispose the comparison chamber directly adjacent to the operating tape chamber.

The comparison standard may be obtained in different manner, for example, by the provision of switching means which take into consideration the capacitance value depending upon the air humidity and/or the temperature.

The switching and control means required for the invention, including the measuring bridge, circuitry therefor and for the control and operation of the tape winding means and the like may be provided throughout in accordance with known and approved practice employing known and approved means.

Changes may be made within the scope and spirit of the appended claims in which is defined what is believed to be new and desired to have protected by Letters Patent.

I claim:

1. In an apparatus for processing magnetic tape comprising non-metallic strip material having magnetizable material associated therewith, said apparatus having a magnetic tape-processing head through which the tape passes, and means for moving such magnetic tape through said magnetic head, the combination of a tape cassette disposed to receive tape being moved by said tape moving means, said cassette having oppositely disposed conductive walls arranged to form opposite sides of a capacitor, between which the desired length of tape is to be stored, with the tape disposed between such walls functioning as a dielectric for said capacitor, whereby the effective capacity of said capacitor is a function of the length of tape stored therein, and means operatively connected with said capacitor for controlling the amount of tape in said cassette.

2. An apparatus according to claim 1, comprising means forming a comparison capacitance effective in a comparison circuit forming a part of said means for controlling the amount of tape in said cassette.

3. An apparatus according to claim 2, wherein said means forming a comparison capacitance comprises a second cassette having oppositely disposed conductive walls arranged to form opposite sides of the comparison capacitance, said comparison capacitance containing a comparison length of non-metallic magnetic tape, which constitutes the criterion for the length of magnetic tape contained in said first named cassette.

4. An apparatus according to claim 3, wherein said cassettes are constructed as two adjacent chambers formed by a plurality of spaced apart capacitor plates defining corresponding walls of the two adjacently disposed chambers.

References Cited by the Examiner

UNITED STATES PATENTS

| | | | |
|---|---|---|---|
| 2,512,372 | 6/1950 | Pakala | 318—306 |
| 2,725,508 | 11/1955 | Bailey et al. | 318—6 |
| 2,778,634 | 1/1957 | Gams et al. | 179—100.2 X |
| 2,828,455 | 3/1958 | Kraay et al. | 318—6 |
| 2,866,637 | 12/1958 | Pendleton | 179—100.2 X |
| 2,877,397 | 3/1959 | Poschner et al. | 317—246 X |
| 2,952,415 | 9/1960 | Gilson | 242—55.12 |
| 3,059,870 | 10/1962 | Hall et al. | 242—55.12 |

MERVIN STEIN, *Primary Examiner.*

ROBERT H. ROSE, NEWTON N. LOVEWELL, IRVING L. SRAGOW, BERNARD KONICK, *Examiners.*